US009811980B1

(12) United States Patent
Kowalchuk et al.

(10) Patent No.: US 9,811,980 B1
(45) Date of Patent: Nov. 7, 2017

(54) BLACKJACK SIDE BET BASED ON POKER HAND FORMED FROM DEALER'S BLACKJACK HAND

(71) Applicant: Caesars Entertainment Operating Company, Inc., Las Vegas, NV (US)

(72) Inventors: Jeffrey Charles Kowalchuk, Henderson, NV (US); Jonathan James Ozark, Henderson, NV (US); Nathan Ronald Armogan, Las Vegas, NV (US)

(73) Assignee: Caesars Entertainment Operating Company, Inc., Las Vegas, NV (US)

( * ) Notice: Subject to any disclaimer, the term of this patent is extended or adjusted under 35 U.S.C. 154(b) by 0 days.

(21) Appl. No.: 15/053,844

(22) Filed: Feb. 25, 2016

Related U.S. Application Data

(63) Continuation of application No. 14/218,515, filed on Mar. 18, 2014, now abandoned.

(51) Int. Cl.
*A63F 13/00* (2014.01)
*G07F 17/32* (2006.01)

(52) U.S. Cl.
CPC ...... *G07F 17/3293* (2013.01); *G07F 17/3244* (2013.01)

(58) Field of Classification Search
None
See application file for complete search history.

(56) References Cited

U.S. PATENT DOCUMENTS 4,614,342 A 9/1986 Takashima
4,743,022 A 5/1988 Wood
4,836,553 A 6/1989 Suttle et al.
4,861,041 A 8/1989 Jones et al.
5,022,653 A 6/1991 Suttle et al.
5,046,736 A 9/1991 Bridgeman et al.
5,098,107 A 3/1992 Boylan et al.
5,154,429 A 10/1992 LeVasseur
5,174,579 A 12/1992 Griffiths
5,257,784 A 11/1993 Boylan et al.
5,257,810 A 11/1993 Schorr et al.
(Continued)

FOREIGN PATENT DOCUMENTS

WO WO 2006/118849 A1 11/2006

OTHER PUBLICATIONS

Wizard of Odds Consulting, Inc., "Blackjack Side Bets—Analyzed," Last Updated Aug. 3, 2014, 93 Pages, [online] [Retrieved on Aug. 14, 2014] Retrieved from the internet <URL:http://wizardofodds.com/games/blackjack/appendix/8/#21plus3>.

*Primary Examiner* — Jason Yen
(74) *Attorney, Agent, or Firm* — Greenberg Traurig, LLP

(57) ABSTRACT

A blackjack game provides a side bet that the cards dealt to form the dealer's hand will match one of a predetermined set of winning poker hands. A blackjack hand is dealt to the player and a dealer, wherein each hand comprises a plurality of cards. The outcome of the blackjack hand is determined according to blackjack rules. The cards in the dealer's hand are then arranged to form a poker hand. Furthermore, the dealer's poker hand may be modified using cards selected from the player's hand into the dealer's hand to form the poker hand. Modification can be by substitution or addition of cards from the player's hand. The player wins the side bet if the dealer's poker hand matches one of a set of predetermined poker hands.

19 Claims, 5 Drawing Sheets

(56) References Cited

U.S. PATENT DOCUMENTS 5,265,877 A 11/1993 Boylan et al.
5,275,414 A 1/1994 Stephens et al.
5,275,415 A 1/1994 Wisted
5,288,077 A 2/1994 Jones
5,288,081 A 2/1994 Breeding
5,294,128 A 3/1994 Marquez
5,308,065 A 5/1994 Bridgeman et al.
5,366,228 A 11/1994 Kangsanaraks
5,377,973 A 1/1995 Jones et al.
5,377,993 A 1/1995 Josephs
5,395,120 A 3/1995 Malek
5,397,128 A 3/1995 Hesse et al.
5,431,408 A 7/1995 Adams
5,489,101 A 2/1996 Moody
5,505,449 A 4/1996 Eberhardt et al.
5,538,252 A 7/1996 Green
5,569,082 A 10/1996 Kaye
5,584,486 A 12/1996 Franklin
5,630,757 A 5/1997 Gagin et al.
5,636,843 A 6/1997 Roberts
5,639,092 A 6/1997 Macaisa
5,653,444 A 8/1997 Dahl
5,673,917 A 10/1997 Vancura
5,678,821 A 10/1997 Hedman
5,685,774 A 11/1997 Webb
5,732,950 A 3/1998 Moody
5,743,530 A 4/1998 Sklad et al.
5,788,574 A 8/1998 Ornstein et al.
5,839,730 A 11/1998 Pike
5,873,571 A 2/1999 Vaisman et al.
5,947,822 A 9/1999 Weiss
6,012,719 A 1/2000 Webb
6,056,641 A 5/2000 Webb
6,070,875 A 6/2000 Boylan et al.
6,179,293 B1 1/2001 Hedman
6,234,895 B1 5/2001 Jones et al.
6,237,916 B1 5/2001 Webb
6,293,551 B1 9/2001 Webb
RE37,588 E 3/2002 Ornstein
6,371,867 B1 4/2002 Webb
6,409,174 B1 6/2002 Demarest
6,471,210 B1 10/2002 Goldman et al.
6,481,717 B1 11/2002 Richardelle
6,481,719 B2 11/2002 Webb
6,523,831 B2 2/2003 Webb
6,749,200 B2 6/2004 Yurkins
6,773,013 B2 8/2004 Caldwell
6,854,733 B2 2/2005 Webb
6,863,274 B2 3/2005 Webb
6,877,748 B1 4/2005 Patroni et al.
6,902,167 B2 6/2005 Webb
6,959,928 B2 11/2005 Schultz
RE38,982 E 2/2006 Forte et al.
7,032,902 B1 4/2006 Yuan
7,137,630 B2 11/2006 Yurkins
7,175,180 B2 2/2007 Webb
7,175,522 B2 2/2007 Hartl
7,222,854 B2 5/2007 Sorge
7,222,855 B2 5/2007 Sorge
7,416,187 B2 8/2008 Forster
7,419,162 B2 9/2008 Lancaster et al.
7,432,172 B2 10/2008 Shimizu et al.
7,438,294 B2 10/2008 Mendola et al.
7,462,102 B1 12/2008 Mendola et al.
7,552,927 B2 6/2009 Moss
7,562,877 B1 7/2009 Hess et al.
7,584,967 B2 9/2009 Webb et al.
7,585,217 B2 9/2009 Lutnick et al.
7,665,737 B1 2/2010 Ramirez
7,789,754 B2 9/2010 Asher et al.
7,833,101 B2 11/2010 Lutnick et al.
7,931,526 B2 4/2011 Ramirez
7,942,731 B2 5/2011 Walker et al.
7,997,973 B2 8/2011 Lutnick et al.
8,020,872 B2 9/2011 Forster
8,070,582 B2 12/2011 Lutnick et al.
8,123,616 B2 2/2012 Wells et al.
8,142,283 B2 3/2012 Lutnick et al.
8,177,615 B2 5/2012 Jackson
8,216,056 B2 7/2012 Lutnick et al.
8,231,458 B2 7/2012 Baerlocher et al.
8,235,812 B2 8/2012 Baerlocher et al.
8,292,714 B2 10/2012 Kennedy
8,323,102 B2 12/2012 Lutnick et al.
8,382,113 B2 2/2013 Costa
8,382,114 B2 2/2013 Johnston
8,393,954 B2 3/2013 Lutnick et al.
8,398,481 B2 3/2013 Lutnick et al.
8,398,489 B2 3/2013 Lutnick et al.
8,480,471 B2 7/2013 Lutnick et al.
8,496,508 B2 7/2013 Lutnick et al.
8,500,533 B2 8/2013 Lutnick et al.
8,535,160 B2 9/2013 Lutnick et al.
8,636,575 B2 1/2014 Lutnick et al.
8,668,566 B2 3/2014 Lutnick et al.
8,688,517 B2 4/2014 Lutnick et al.
8,715,028 B2 5/2014 Lutnick et al.
8,758,109 B2 6/2014 Lutnick
8,758,111 B2 6/2014 Lutnick
8,764,538 B2 7/2014 Lutnick et al.
8,764,541 B2 7/2014 Lutnick et al.
8,771,058 B2 7/2014 Alderucci et al.
2001/0035610 A1* 11/2001 Webb .................. A63F 3/00157 273/292
2002/0077168 A1 6/2002 Jones et al.
2002/0153663 A1 10/2002 Hodge
2003/0057648 A1 3/2003 Webb
2004/0000758 A1 1/2004 Yurkins
2004/0061288 A1 4/2004 Snow
2004/0080110 A1 4/2004 Webb
2004/0090008 A1 5/2004 Caldwell
2004/0108656 A1 6/2004 Snow
2004/0164491 A1 8/2004 Webb
2004/0239033 A1 12/2004 Zahedi
2005/0093229 A1 5/2005 Dewayne et al.
2005/0104292 A1 5/2005 Schultz
2005/0116414 A1 6/2005 Yurkins
2005/0116417 A1 6/2005 Soltys et al.
2005/0121854 A1 6/2005 Webb
2005/0253338 A1 11/2005 Daines
2006/0027969 A1* 2/2006 Schultz ............... A63F 3/00157 273/292
2006/0066050 A1 3/2006 Sorge
2006/0082064 A1 4/2006 Caterinicchio et al.
2006/0131809 A1 6/2006 Lancaster et al.
2006/0244216 A1 11/2006 O'Hagan
2006/0255540 A1 11/2006 O'Hagan
2007/0052175 A1 3/2007 McGurk et al.
2007/0069467 A1 3/2007 Forster
2007/0096394 A1 5/2007 Mendola et al.
2007/0132183 A1 6/2007 Moses
2007/0158910 A1 7/2007 Mendola et al.
2007/0164515 A1 7/2007 Sorge
2007/0176366 A1 8/2007 Jones
2007/0187895 A1 8/2007 LaClaire et al.
2007/0194533 A1 8/2007 Brunelle
2007/0228653 A1 10/2007 Lambert et al.
2007/0241505 A1 10/2007 Kling et al.
2007/0241506 A1* 10/2007 Kling ........................ A63F 1/00 273/292
2007/0262527 A1 11/2007 Moss
2008/0064467 A1 3/2008 Reiner
2008/0113703 A1 5/2008 Kekempanos et al.
2008/0150232 A1 6/2008 Deza et al.
2008/0203665 A1 8/2008 Simpson
2008/0230992 A1 9/2008 Lutnick et al.
2008/0272546 A1 11/2008 Forster
2009/0085296 A1 4/2009 Webb
2009/0121434 A1 5/2009 Baerlocher et al.
2009/0184473 A1 7/2009 Elias et al.
2009/0224478 A1 9/2009 Evans et al.
2009/0267301 A1 10/2009 Au-Yeung
2009/0295087 A1 12/2009 Kling et al.
2010/0109246 A1 5/2010 Ramirez

(56) References Cited

U.S. PATENT DOCUMENTS

| | | | | |
|---|---|---|---|---|
| 2010/0252997 | A1 | 10/2010 | Walker et al. | |
| 2011/0018201 | A1 | 1/2011 | Stern | |
| 2011/0198809 | A1 | 8/2011 | Sparago | |
| 2011/0269520 | A1 | 11/2011 | Amaitis et al. | |
| 2011/0278795 | A1* | 11/2011 | Denke | A63F 1/00 273/292 |
| 2012/0112412 | A1 | 5/2012 | Esposito | |
| 2012/0220357 | A1 | 8/2012 | Stern | |
| 2013/0023315 | A1 | 1/2013 | Gilula | |
| 2013/0043651 | A1* | 2/2013 | Chamberlain | A63F 1/00 273/138.1 |
| 2013/0267289 | A1 | 10/2013 | Kokosky | |
| 2013/0324204 | A1 | 12/2013 | Snow et al. | |

* cited by examiner

BLACKJACK SIDE BET BASED ON POKER HAND FORMED FROM DEALER'S BLACKJACK HAND

CROSS REFERENCE TO RELATED APPLICATIONS

This application is a continuation of co-pending U.S. application Ser. No. 14/218,515, filed Mar. 18, 2014, the contents of which are incorporated by reference in its entirety.

BACKGROUND

1. Field of Art

The disclosure generally relates to casino card games in which indicia bearing cards are intended to be combined interactively based upon their indicia, and wherein an ultimate outcome of the game depends on the relative odds of a combination of cards, given a random distribution of cards to a participant, and in particular to a game of blackjack involving side bets on the combinations of cards received by a participant.

2. Description of the Related Art

Casinos and other gambling establishments offer many games of chance for players to participate in. In particular, card games such as blackjack are especially popular with players, who bet on the outcome of each hand, in which the player's hand beats the dealer's hand. However, conventional versions of blackjack, with only one primary bet, offer limited betting options to players. Additional betting options would beneficially increase the player's interest and involvement in the blackjack game.

SUMMARY OF INVENTION

A blackjack game in accordance with the present invention provides a side bet that the cards dealt to form the dealer's hand will match one of a predetermined set of winning poker hands. In one embodiment, the player places the side bet in addition to a player's primary bet on the outcome of the blackjack game. A blackjack hand is dealt to the player and a dealer, wherein each hand comprises a plurality of cards. The outcome of the blackjack game is determined according to conventional blackjack rules based on the player's blackjack hand and the dealer's blackjack hand, as to whether the player wins or loses the primary bet. Subsequently, the dealer arranges the cards in the dealer's hand to form a poker hand. The player wins the side bet if the dealer's poker hand matches one of a predetermined set of winning poker hands, such as a straight flush, a full house, a three or more of a kind, or a pair. The dealer pays the player a payout for a winning side bet. In one embodiment, the dealer's poker hand is formed from six cards; in another embodiment, the dealer's poker hand is formed from five cards. In one six card embodiment, the payout for the dealer's poker hand forming a six card straight flush, i.e., A-2-3-4-5-6 in suit, is US $1,000,000. If the dealer's poker hand does not match one of the predetermined set of winning poker hands, the dealer collects the player's side bet.

The dealer's poker hand may be a natural poker hand, containing only cards from the dealer's blackjack hand. In other embodiments, the dealer's poker hand may be formed by modifying the dealer's poker hand with one or more cards from the player's hand, so as to form one of the predetermined set of winning poker hands. The dealer's hand can be modified by adding one or more cards from the player's hand to the dealer's hand ("addition") or substituting one or more cards in the dealer's hand for an equal number of cards in the player's hand ("substitution"). In some embodiments, the player may be limited to modifying the dealer's hand using only addition or only substitution. In other embodiments, the player may use both addition and substitution to modify the dealer's hand. Modification by addition or substitution does not require physically combining cards from the player's hand with cards from the dealer's hand, but instead entails the logical formation of the dealer's hand based on cards selected from the player's hand.

In embodiments where the dealer's poker hand may be modified, the number of cards that the dealer's poker hand may be modified with may be determined by the amount of the player's side bet amount and may be limited to a maximum number of cards (e.g., at most three cards from the player's hand may be used to modify the dealer's poker hand). Furthermore, the type of modification may be governed by the amount of the player's secondary wager amount. For example, the player may need to wager a minimum amount to enable modification by substitution or modification by addition. Another aspect of the embodiments is a blackjack gaming table having a designated area for receiving a side bet on a poker hand formed from the dealer's blackjack hand, and a designated area for locating one or more cards selected from the player's hand that will modify the dealer's hand.

In one embodiment of the game, a primary wager on an outcome of a blackjack hand is received from a player. In addition to the primary wager, a secondary wager on whether a dealer's poker hand matches one of a predetermined winning poker hands is received from the player. Blackjack hands are dealt to both the dealer and the player and the outcome of the primary wager is determined based on conventional blackjack rules. After the primary wager has been determined, a dealer's poker hand is formed from the cards in the dealer's blackjack hand. Based on the amount of the player's secondary wager, the player may modify the dealer's poker hand by adding or substituting one or more cards from the player's hand to form one of the predetermined set of winning poker hands. The outcome of the secondary wager is determined based on whether the dealer's poker hand matches one of a predetermined set of winning poker hands.

BRIEF DESCRIPTION OF DRAWINGS

The disclosed embodiments have other advantages and features which will be more readily apparent from the detailed description, the appended claims, and the accompanying figures. A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
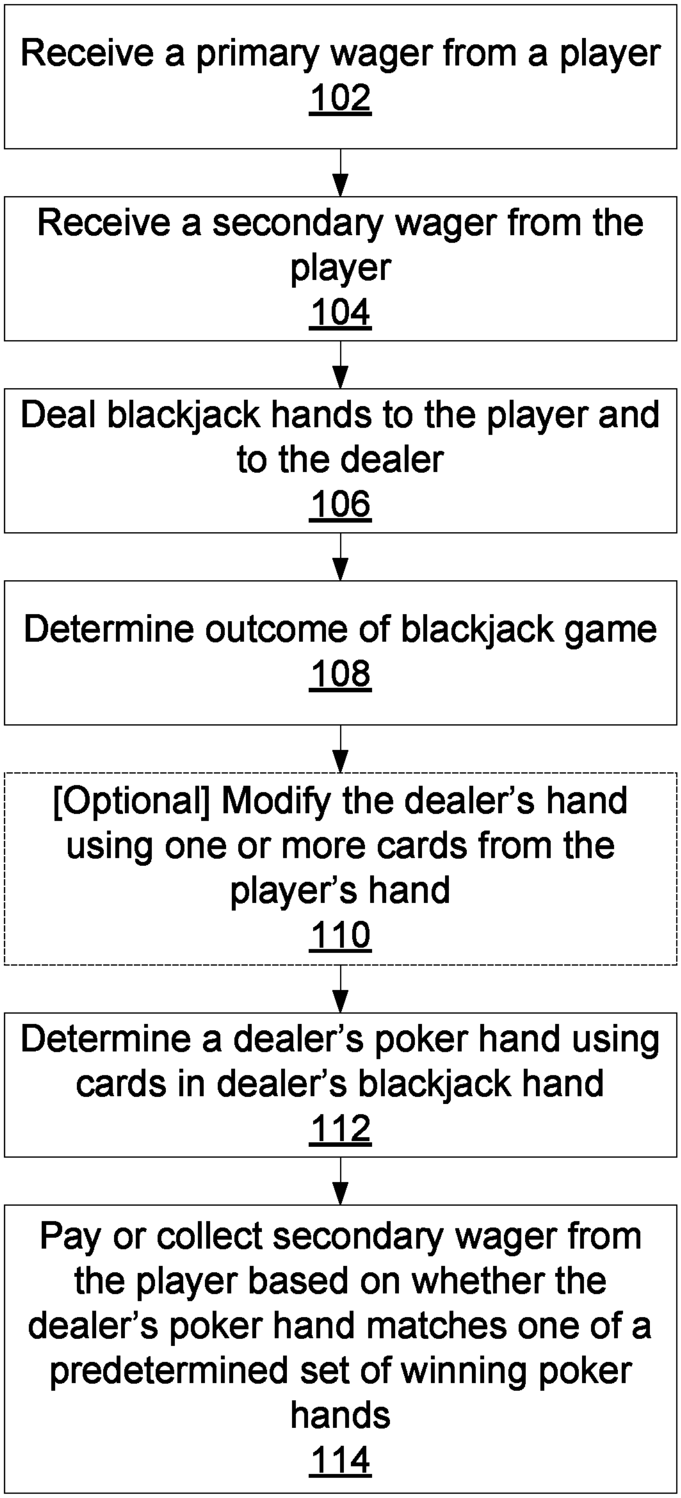
FIG. 1 illustrates a flowchart describing the process of playing a game of blackjack with a poker hand side bet, according to one example embodiment.

Overview of the Poker Side Bet Based on Poker Hand Formed from Dealer's Blackjack Hand FIG. 1 illustrates a flowchart describing the process of playing a game of blackjack with a side bet on a poker hand formed from the dealer's poker hand, according to one embodiment. Unless otherwise noted, the process embodied in FIG. 1 is described with respect to the operations of the dealer, which may be a human dealer using a casino table. Alternatively, the dealer can be an electronic gaming machine, a software application on a gaming device, a web application, or on any automated mechanism for casino card games. Other embodiments of the game may perform the illustrated steps in a different order or perform additional or alternative steps.

The game begins by receiving 102 a primary wager from a player. The primary wager can be in the form of a dollar amount, a number of casino tokens, an amount on a patron tracking or financial card, or any other form of a wager. The primary wager amount can be fixed (e.g., a flat $5 wager) or be a variable amount. For example, the game can feature a minimum primary wager amount that can be increased by the player.

A secondary wager is received 104 from the player. The secondary wager is a dollar amount, a number of casino tokens, a number of credits, an amount on a patron tracking or other financial card, or any other form of a wager. The secondary wager may be expressed as a fixed amount, a portion of the primary wager, or a variable amount chosen by the player. For example, the secondary wager includes a base amount, wherein the player can increase the secondary wager from the base amount. For example, the player can incrementally increase the secondary wager amount from the base amount in $5 increments. Furthermore, the number of increments or amount a player can increase the secondary wager by can be limited (e.g., the player may be limited to two increases of the secondary wager). The dealer may accept 104 the secondary wager before, while, or after accepting 102 the primary wager.

Blackjack hands are dealt 106 to the player and to the dealer. The blackjack hand dealt to the player includes two face-up cards while the blackjack hand dealt to the dealer includes one face-up card and one face-down card. The blackjack hands are dealt to the player and to the dealer from one or more decks of cards, wherein the deck of cards includes at least one standard 52-card deck. In some cases, the blackjack hands are dealt from a deck of cards that includes a plurality of standard 52-card decks. Blackjack hands are dealt to the player and to the dealer one card at a time, round-robin style, according to conventional blackjack rules.

After an initial blackjack hand has been dealt to the player and to the dealer, the player can request additional cards to supplement the player's blackjack hand. The player can request an additional card ("hit") from the dealer until the card total in the player's hand exceeds twenty-one, wherein the card total is the sum of card values in the player's blackjack hand. In addition to requesting additional cards, the player can take other actions (e.g., double down, split, take insurance, and/or surrender) before or after requesting additional cards, according to conventional blackjack rules. After the player finishes requesting additional cards, the dealer can also request additional cards to supplement the dealer's blackjack hand, according to conventional blackjack rules. In some variants of the game, the dealer may not request additional cards if the sum of card values in the dealer's blackjack hand is greater than sixteen.

The outcome of the primary blackjack game is determined 108 according to conventional blackjack rules. The player wins the primary wager if the sum of card values in the player's blackjack hand is less than or equal to twenty-one and greater than the sum of card values in the dealer's blackjack hand. In other cases, the player wins the primary wager if the sum of card values in the dealer's blackjack hand exceeds twenty-one and the sum of card values in the player's blackjack hand is less than or equal to twenty-one.

The outcome of the secondary wager is determined by first determining 112 a dealer's poker hand formed using cards in the dealer's blackjack hand. In one embodiment, the dealer's poker hand is formed from five cards, if there are five or more cards in the dealer's hand. Alternatively, the dealer's poker hand is formed from six cards, if there are six or more cards in the dealer's hand. Another alternative is to allow either a five or a six card poker hand if there are six or more cards in the dealer's hand. In other embodiments, the dealer's poker hand made by formed from fewer than five cards. The determination 112 of the dealer's poker hand is further explained below in conjunction with FIG. 2.

In one embodiment, a natural poker hand can be formed solely from the cards in the dealer's blackjack hand. Optionally, the player may modify 110 the dealer's poker hand using one or more cards from the player's blackjack hand to form a modified dealer's poker hand. The modification process is further explained below in conjunction with FIG. 2. The modification 110 may be performed by the player identifying one or more cards from his blackjack hand for use as the modifying card or cards. The cards may be identified by having them placed in a designated location(s) on the casino gaming table, or by selecting cards shown on a display screen of a gaming machine. In one embodiment, the modification 110 requires that the dealer's hand already have the required number of cards to form the poker hand, e.g., there must be five cards in the dealer's hand if a five card hand is required, or there must be six cards in the dealer's hand if a six card hand is required. In other embodiments, the player may modify 110 the dealer's hand if the dealer's hand contains fewer than five or six cards.

Modification 110 can include substituting one or more cards from the player's hand for an equal number of cards in the dealer's hand ("substitution"). In other words, substitution requires that each card selected from the player's hand must replace a card in the dealer's hand. For example, if the dealer has (2, 3, 3, 5, 6), and the player has (4, 7, K), the player can substitute his 4 for one of the dealer's 3's to form a five-card straight (2, 3, 4, 5, 6); however if the dealer only has four cards, (2, 3, 5, 6), using modification by substitution, the player would not be able to add the 4 to form to the dealer's hand to form the five-card straight.

In other embodiments, modification 110 can by performed by adding cards to the dealer's hand ("addition"). For example, if the dealer's blackjack hand has only three cards and five cards are required, a player can add two cards from the player's hand to form a five card dealer's poker hand; thus if the dealer has (4, 7, 7), the player can add (4, 7) from his hand to form a full house (4, 4, 7, 7, 7). As another example, if as above, the dealer only has four cards, (2, 3, 5, 6), and the player has (4, 7, K), then using modification by addition, the player would be able to add the 4 to the dealer's hand to form the five-card straight (2, 3, 4, 5, 6). This form of modification 110 may be allowed only where the dealer's hand does not have the required number of cards to form the poker hand, and may further require using all of the cards in the dealer's blackjack hand.

In other embodiments, modification 110 can include wild cards, special cards (e.g., one-eyed jacks or kinds, queen of spades) or other apparent forms of poker hand modifications. Modification 110 may include combinations of types of modifications, such as both substitution and addition. Where the player has split a pair in the blackjack hand, only one of the hands may be used as the source for modifying 110 cards to the dealer's poker hand.

The secondary wager is paid off or collected from 114 the player based on whether the dealer's poker hand matches one of a predetermined set of winning poker hands. The predetermined set of winning poker hands can include any set or subset of the traditional poker hands, or other designated hands. The traditional poker hands are {high card, pair, two pair, three of a kind, straight, flush, full house, four of a kind, straight flush}. For example, the predetermined set of winning poker hands can be the subset {pair, three of a kind, full house}; or as another example the predetermined set of winning poker hands can be the subset {two pair, straight, four of a kind, straight flush, royal flush}. Other subsets of the traditional poker hands may be used as well. The poker hands in the predetermined set of winning poker hands can be ranked according to conventional poker rules.

Furthermore, the predetermined set of winning poker hands may include non-traditional hands, formed from five or six cards. These non-traditional hands may include a six card straight flush such as (A-2-3-4-5-6). In one embodiment where the poker hand has at least six cards, the six card straight flush is the highest-ranked poker hand in the predetermined set of winning poker hands. Furthermore, other non-traditional hands that may be used include hands solely of five of a kind, all even cards, all odd cards, all face cards, cards of one color (all red or all black cards), skip straights, "dog" and "cat" hands, three pairs, two three of a kinds, or a four of kind and a pair, or other combinations of cards apparent to a person having ordinary skill in the art may be included in the predetermined set of winning hands. The selection of which hands are designated as the predetermined winning hands and their associated payouts is established by the gaming operator to ensure a minimum house advantage, given the expected probabilities of the hands occurring during play.

The dealer pays 114 a payout to the player when the dealer's poker hand matches one of the predetermined set of winning poker hands. The payout is based on the player's secondary wager amount and a pay table defining payout ratios (odds) for each of the predetermined winning hands. Table 1 below shows an example pay table:

TABLE 1

Example Paytable

| Hand | $X Bet Pays |
|---|---|
| Six Card Straight Flush | 200,000× |
| Full House (Pair + 3 or more of a Kind) | 100× |
| 3 (or more) of a Kind | 15× |
| Pair | 3× |
| No Pay | −1× |

The payout may be based on one or more pay tables. Since the odds of forming a winning dealer's poker hand change depending on the type of modification in effect, different sets of payout odds may be applied to different types of modification to maintain a minimum house advantage. For example, there may be a separate pay table that is applied to cases in which the dealer's poker hand is a natural poker hand, formed without modification. There may be a second pay table for cases in which the dealer's poker hand is modified via substitution, and a third pay table for cases in which the dealer's poker hand is modified via addition. In other embodiments, there may be a single pay table that covers all poker hands, regardless of how the dealer's hand is formed.

In one embodiment, the dealer pays 114 the player a fixed amount, regardless of the secondary wager amount, when the dealer's poker hand matches one of the predetermined set of winning hands. For example, the payout for the dealer's poker hand forming a six card straight flush can be a fixed amount set at $1,000,000, rather than the 200,000-to-1 odds as shown in Table 1. In one embodiment, the hand A-2-3-4-5-6 in suit is designated as the highest six card straight flush; in other embodiments where the player can add cards to the dealer's hand, the highest six card hand will be different, as determined by the operator. Other fixed payout hands can include a six of a kind (e.g., six A's or six K's). Tables 2 and 3 illustrate other example pay tables.

TABLE 2

| Hand | $X Bet Pays |
|---|---|
| A-6 Suited | 200,000× |
| Two 3 (or more) of a Kind | 1,500× |
| Full House (Pair + 3 or more of a Kind) | 50× |
| 4 (or more) of a Suit | 15× |
| 3 (or more) of a Kind | 7× |
| 3 (or more) Card Straight | 6× |
| Blackjack | 5× |

TABLE 3

| Hand | $X Bet Pays |
|---|---|
| 5 Card Straight Flush | 200,000× |
| 4 of a Kind | 1,500× |
| Full House (Pair + 3 or more of a Kind) | 50× |
| Flush | 15× |
| Straight | 7× |
| 3 of a Kind | 6× |
| Two Pair | 5× |

In some variants of the game, in which multiple players win the secondary wager, the dealer pays each player eligible to collect the secondary wager. For example, if the dealer forms a natural flush, each player who paid a secondary wager wins the secondary wager. In another example, the dealer may form a natural, 7-high flush. If a player modifies the dealer's poker hand with an Ace of the same suit to form an Ace-high flush, the player with the Ace-high flush and each other player who submitted a secondary wager is eligible to win the secondary wager. The players may be paid according to different pay tables, depending on if the formed poker hand is a natural poker hand, a poker hand formed through substitution, or a poker hand is formed through addition. In another example, the dealer forms a six card straight flush. If the payout for the six card straight flush is $1,000,000, each player who submitted a secondary wager may be paid the full $1,000,000.

In other embodiments, the dealer pays only one player ("the best winner"). The best winner is the player who forms the highest poker hand based on the cards in the dealer's hand. For example, the dealer may have a natural poker hand of a 7-high flush. However, a player who modifies the dealer's poker hand with a Ace of the same suit to form a Ace-high flush is the "best winner," since that player formed the highest-ranked poker hand from the dealer's cards This player would be paid for the secondary wager, but players who submitted a secondary wager and formed lower-ranked poker hands, even if they matched one of the predetermined poker hands in an applicable pay table (e.g., the dealer's natural flush), lose their secondary wagers.

In another embodiment, each player associated with a winning poker hand is eligible for the secondary wager, but the best winner is eligible to receive a greater reward based on a second pay table. For example, the dealer may have a natural poker hand of a 7-high flush. However, if a player modifies the dealer's poker hand with a Ace of the same suit to form a Ace-high flush would be considered the "best winner." The players associated with the dealer's natural hand may be paid at according to 15-to-1 odds, while the best winner may be paid at a higher payout ratio, such as 20-to-1, or be paid an additional bonus amount (e.g., $10).

In some embodiment, in which two or more players would have equally-ranked winning dealer's poker hands, the best winner is determined by a tiebreaker, wherein the tiebreaker is dependent on the cards in the player's blackjack hand. For example, the tiebreaker may be based on the card value in each player's blackjack hand, with the tie breaker won by the player with the single highest valued card. In another embodiment, the tiebreaker is won by the player with the highest blackjack total. In a third embodiment, the tiebreaker is won player with the largest number of cards in the player's blackjack hand. Optionally, the dealer pays player(s) who lost the tiebreaker a lesser amount than paid to the player who wins the tiebreaker. For example, the player who wins the tiebreaker is paid the full payout for a six card straight flush, and the players who lost the tiebreaker are paid for the same six card straight flush at a lower payout ratio, for example 20,000-to-1. In some cases, the tiebreaker is only in effect when the dealer's poker hand matches the highest-ranked one of the set of predetermined winning poker hands; e.g., a tiebreaker is used only for the six-card straight flush, whereas multiple players are paid on lesser winning hands.

The dealer collects 114 the player's secondary wager if the dealer's hand does not match one of the predetermined winning poker hands. The dealer may also collect 114 the player's secondary wager if the player loses the primary wager. For example, in one embodiment, if the player loses the primary blackjack game, the player loses the secondary wager, regardless of dealer's poker hand matching one of the predetermining winning hands. In some embodiments, the secondary wager is paid only if the dealer's blackjack hand is a bust.

Overview of the Modification Process

Figure 2:
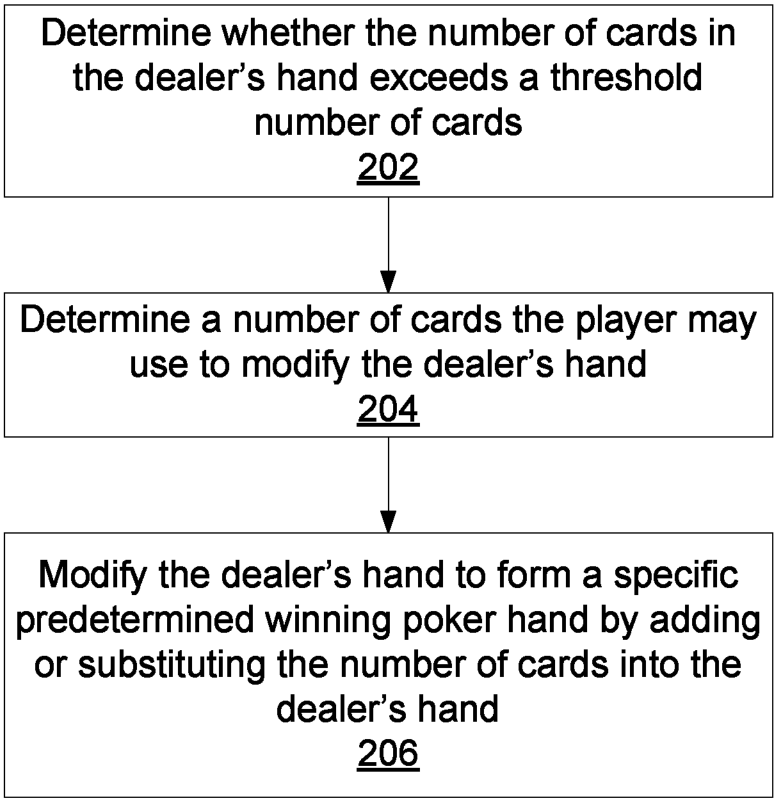
FIG. 2 illustrates a flowchart describing the process of determining a dealer's poker hand, according to one example embodiment.

FIG. 2 illustrates a flowchart further describing the process of modifying 110 a dealer's poker hand, according to various embodiments. The process illustrated in FIG. 2 may be used in conjunction with the process of FIG. 1. Unless otherwise noted, the process of FIG. 2 is described with respect to the operations of the dealer.

The dealer determines 202 whether the number of cards in the dealer's hand exceeds a threshold number of cards. In some variants of the game, the dealer's hand must have the threshold number of cards to form a dealer's poker hand. For example, in one embodiment, the dealer's hand may have to have at least five cards to form a poker hand. Alternatively, the threshold may not limit the dealer's ability to form a poker hand from the dealer's hand, but may limit the ability for the player to optionally modify the dealer's hand. For example, assume five cards are required for the dealer's poker hand, the dealer's hand has four cards (10, 3, 3, 3), and the player has (3, 7, 10). If only substitution is allowed to form the dealer's poker hand, then the player may not substitute a card, because the dealer's hand would only have four cards. However, if addition is allowed, then the player can add his 3 to form a dealer's poker hand of (3, 3, 3, 3, 10), a four of a kind. The dealer determines 204 a number of cards the player may modify the dealer's hand with. The determination 204 can be based on the player's secondary wager amount. In one embodiment, the player may substitute or add cards to the dealer's hand only if the player's secondary wager amount passes a threshold value. For example, in one embodiment, the secondary wager may have a minimum amount of $5 which does not allow for modifications (i.e., only natural dealer's poker hands pay off) and a minimum amount of $10 to allow for modifying the dealer's poker hand by one or more cards.

The number of cards from the player's blackjack hand that may be used to modify the dealer's poker hand may be a function of the secondary wager amount. In one example, the secondary wager amount includes a base amount and zero or more increment amounts each equal to the base amount; the player is allowed to modify the dealer's poker hand with one card from the player's blackjack hand for the base amount, and one card for each increment amount; or alternatively, the player may substitute zero cards for the base amount, and one card for each increment amount. Furthermore, there may be a limit to the number of increment amounts or modifications a player may perform. For example, the player may be limited to modifying the dealer's hand with a maximum of three cards from the player's hand, regardless of the secondary wager amount.

In another embodiment, the secondary wager amount determines the type of modification a player can implement. For example, wagering one increment over the minimum secondary wager amount may allow the player to only substitute a single card, but two increments over the minimum secondary wager amount allows the player to add a single card. Additional increments may allow the player to add or substitute a single card, or may allow the player to add or substitute a plurality of cards. Other combinations of increments and modifications based upon the amount of the secondary wager may be applicable to different embodiments of the game.

In some cases, the dealer determines 204 that the player is allowed to modify the dealer's hand only if the modification results in the dealer's hand forming a specific one (or ones) of the predetermined winning hands. For example, modification may only be allowed if the resulting dealer's poker hand forms a six card straight flush, otherwise modification is not allowed and only natural dealer poker hands are paid as winners. In another embodiment, additions and/or substitutions are allowed if the dealer's poker hand forms any of the predetermined set of winning hands after the addition or substitution.

The dealer's hand is modified 206 to form a specific predetermined winning poker hand by adding or substituting the number of cards into the dealer's hand. The player selects the determined number of cards from the player's hand to modify the dealer's hand with to form the dealer's poker hand. If the cards are substituted into the dealer's hand, the player also selects an equal number of cards from the dealer's hand to be discarded. The cards selected from the player's hand are designated as part of the dealer's hand, though they need not be physically combined with the actual cards of the dealer's hand; instead the selected cards may be placed at one more designated locations on the casino gaming table. In some cases, the selected cards from the player's blackjack hand can only be used to modify the dealer's hand if the dealer's resulting poker hand forms one of the predetermined set of winning poker hands. Furthermore, the selected cards substituted from the player's blackjack hand can only be used if the dealer's resulting poker hand forms the highest-ranked predetermined set of winning poker hands, such as the six card straight flush. In other embodiments, the selection of cards of the player's hand for addition or substitution into the dealer's hands is made by the dealer, selecting the cards from the player's hand that form the best possible dealer's poker hand. This avoids the player making a mistake and selecting cards that do not provide the highest pay out.

Overview of a Modified Blackjack Table

Figure 3:
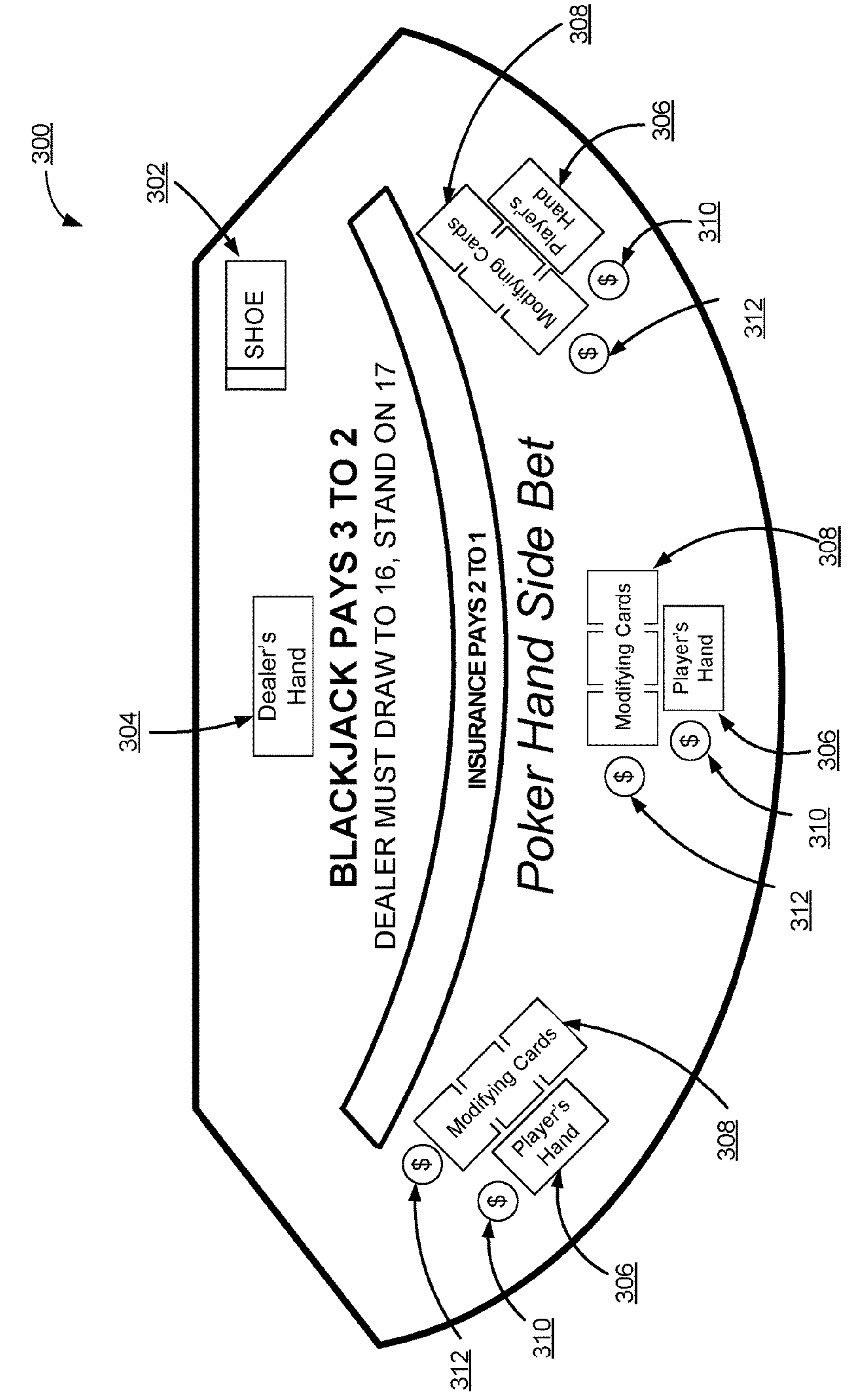
FIG. 3 illustrates an exemplary table layout for playing a game of blackjack with a poker hand side bet, according to one embodiment.

FIG. 3 illustrates an exemplary table layout for a modified blackjack table 300 for an embodiment in which the blackjack game with six-card side bet may be played. The table layout in FIG. 3 only shows playing areas for three blackjack players, but other embodiments of the table layout can accommodate any number of players. Other table layouts may have alternative arrangements of features, or have additional or alternative features. The table may be embodied as a physical object (e.g., a table felt) or be embodied virtually in a gaming application on a computing device. In other embodiments, the game with a six-card side bet is played on a standard blackjack table.

The blackjack table 300 includes a card shoe 302, a dealer's spot 304, a player's spot 306, one or more substitute card spots 308, a primary wager area 310, and a secondary wager area 312. The card shoe 302 contains the deck of cards from which blackjack hands are dealt. The card shoe 302 contains at least one standard 52-card deck. Cards for blackjack hands may be dispensed from a slot in the card shoe 302.

The blackjack table 300 includes a dealer's spot 304 on which the dealer's hand is laid during play. The spot 304 may be an outline on the table 300, as depicted in FIG. 2, or it may be an unmarked area designated for the dealer's hand. While the dealer's spot 304 is shown to be directly in front of the dealer, the spot 304 may be located at other positions on the table surface 300 such that each player can see the dealer's hand.

The blackjack table 300 includes a player's spot 306. The player's hand is laid on the player's respective spot 306, located in front of the player where the player's blackjack hand is laid during a round of blackjack. The player's spot 306 may be outlined on the table 300 or may be an unmarked spot designated for the player's hand.

One or more modifying card spots 308 are designated near to each player's spot 306. During the process of modifying the dealer's hand, the player identifies the modifying cards in the player's hand. The dealer moves the modifying cards into the modifying card spots 308 because the player is not allowed to touch the cards. In some table layouts, each modifying card is placed into a separate modifying card spot, while in other embodiments there is a single modifying card spot 308 per player that accommodates all modifying cards from the player. The modifying card spots 308 may be outlined on the table or may be unmarked spots designated for the modifying cards. In embodiments using a standard blackjack table that does not have the modifying card spot 308, the dealer indicates that a card is a modifying card by orienting the card sideways.

The primary wager area 310 is an indicated space on the table layout in which the player places the primary wager during the blackjack game. The primary wager area 310 is located in front of the player and may be located near the player's spot 306. In other embodiments, the primary wager area 310 may contain an electronic card reader (e.g, RFID, Bluetooth, magstripe) for electronic wager transactions.

The secondary wager area 312 is an indicated space on the blackjack table 312 in which the player places his secondary wager during the blackjack game. The secondary wager area 312 is located in front of the player and may be located near the substitute card spot 308 and the primary wager area 310. In other embodiments, the secondary wager area 312 may contain an electronic card reader (e.g., RFID, Bluetooth, magstripe) for electronic wager transactions.

A pay table (not shown), including the payouts for the predetermined set of winking poker hands, may be displayed on the table surface itself, or on a sign post attached to the table 300 and visible to all players. There may be multiple pay tables for different ways the player can modify the dealer's hand (addition, substitution, etc.).

Overview of an Environment for an Electronic Gaming Machine

Figure 4:
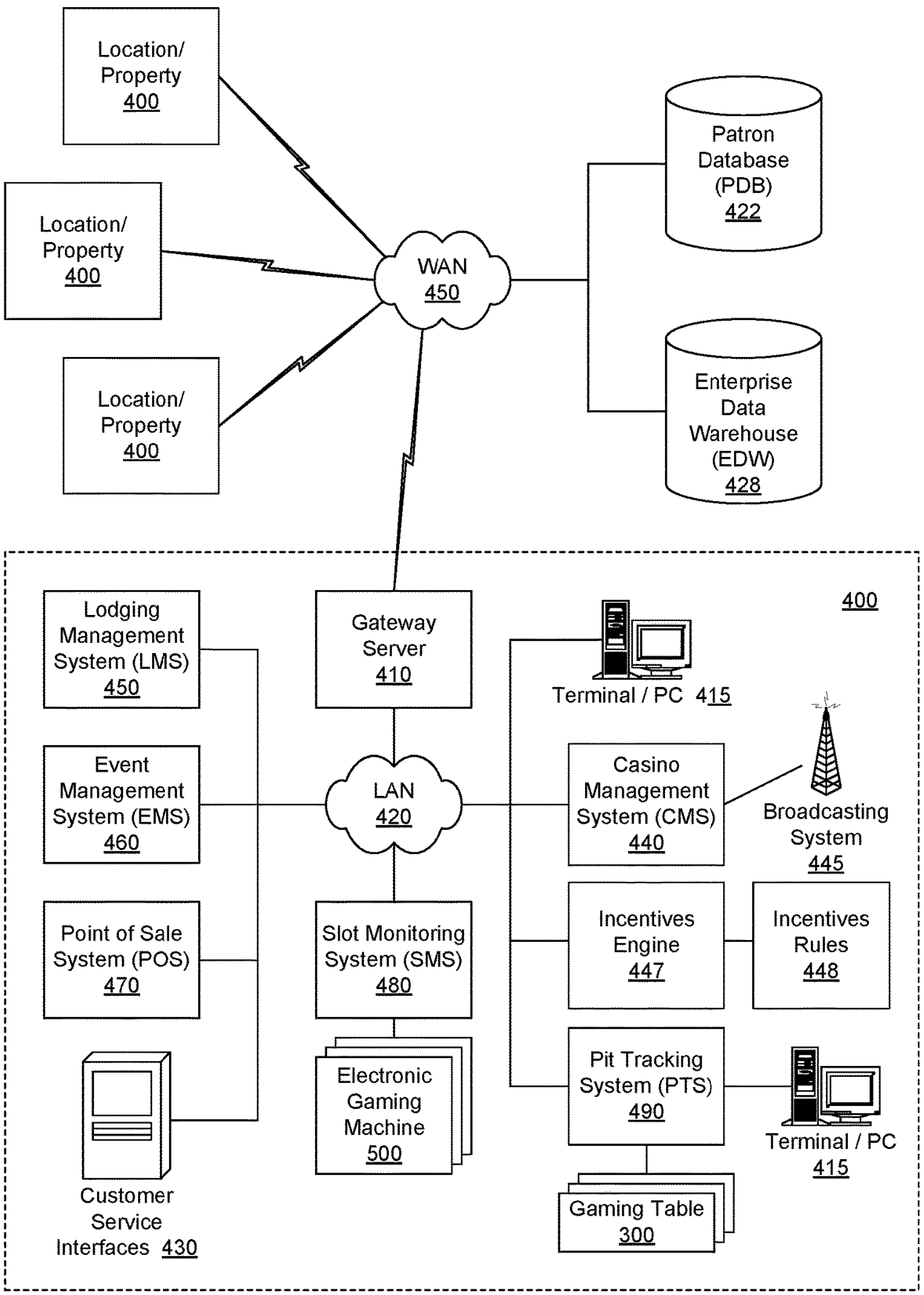
FIG. 4 illustrates an environment for an electronic gaming machine configured to facilitate a game of blackjack with a poker hand side bet, according to one example embodiment.

Embodiments of the disclosed blackjack game may be played on an electronic gaming machine coupled to a casino enterprise network. FIG. 4 illustrates a casino enterprise network for supporting an electronic gaming machine configured to facilitate a game of blackjack with a six-card side bet, according to one embodiment. The environment of FIG. 4 is suited for a casino or other gaming establishment. However, the electronic gaming machine may be implemented as a stand-alone device.

In one embodiment, the casino enterprise network includes a number of casino properties 400, wherein each casino property 400 includes a gateway server 410 for coupling a local network 420 (such as a LAN) at the casino property 400 to a wide area network (WAN) 150. This allows multiple properties 400 to share and exchange data. In addition, the property 400 preferably includes one or more local operator terminals 415 (such as a PC) coupled to the LAN 420, allowing casino personnel to access the system from the property 400. Having an operator terminal 415 at each property 400 allows local casino employees to manage the casino management system 440 at the property level, in real-time, and in response to player or casino needs.

In one embodiment, the gateway server 410 includes an API for sending data pertaining to local player activity over the WAN 450 to other properties or to a central data warehouse, such as the enterprise data warehouse (EDW) 428 and a patron database (PDB) 422. The gateway server 410 communicates with several computer systems for monitoring and tracking operations at the particular property 400.

The PDB 422 provides the system with data regarding individual patrons, or patrons in a casino context. The PDB 422 preferably includes patron accounts (i.e., casino accounts, including casino reward programs) for patrons from all of the casino properties 400. The PDB 422 can be a centralized database or a distributed or federated database with segments of the database located at the casino properties 400. In one embodiment, each patron account in the PDB 422 includes detailed information such as the patron's personal information, preferences, interests, gaming and lodging history, credit rating, comp level, customer value measures, and accumulated credits. A patron's customer value is a measure of the patron's value to the casino based on the patron's betting activity, and optionally based on other activities of the patron from which the casino derives revenue or value. In one embodiment, the customer value measure is a theoretical win value is determined according to the patron's betting activity accumulated at any of the properties affiliated with the enterprise. Credits may be determined according to patron betting activity, but they may also be augmented by other types of activities as well and by special offers and various other promotional programs. These other activities include but are not limited to making a reservation, staying in a hotel, purchasing an item in a retail environment, eating at a restaurant, and attending a show or other events. In another aspect of an embodiment, PDB 422 is coupled via the WAN 450 to the EDW 428 uploading patron activity information for further analysis.

Figure 5:
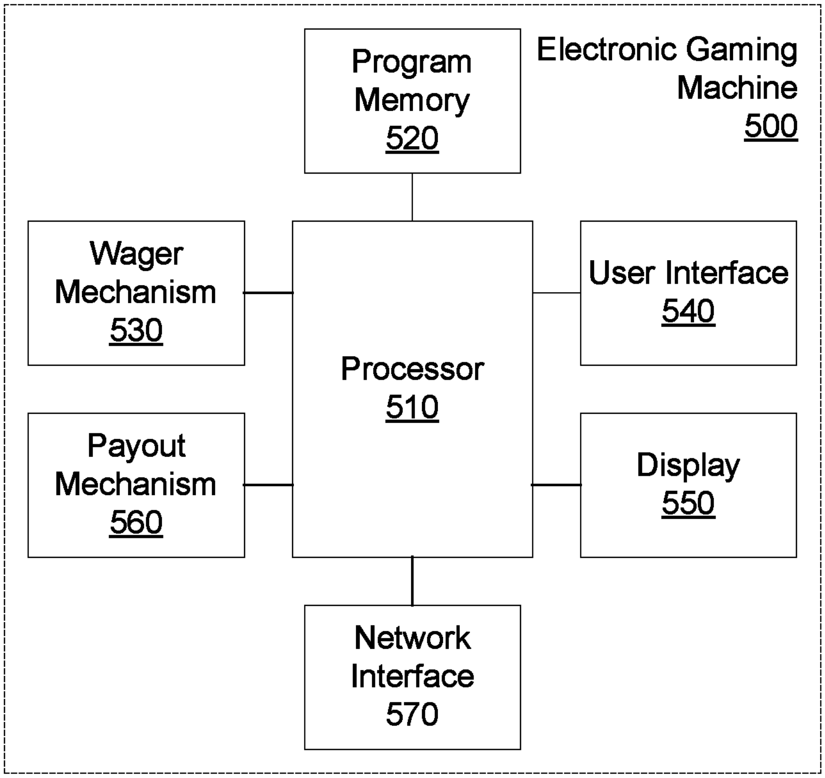
FIG. 5 illustrates a block diagram of an electronic gaming machine configured to host a game of the disclosed blackjack variant, according to one example embodiment.

In one embodiment, patrons are issued tracking cards to interface with the system and thereby allow for tracking of their activities and identification of the patrons at locations in the casino such as gaming machines 500, further described in FIG. 5. Each tracking card preferably includes a magnetic strip, microchip, or other mechanism for storing machine-readable data thereon. When a patron performs some activity at a property, the patron may use the tracking card to interface with the system. For example, in the case of magnetic strip cards, the patron inserts the card through into card reader (i.e., "card-in"). Specifically for tracking patron betting, a slot machine or other gaming machine 500 includes a magnetic stripe card reader (not shown), which is adapted to receive the patron tracking cards. The incorporation of card readers into gaming machines 500 is a standard practice and well known to those of skill in the art. In an alternate or additional method of tracking patron activity, the patron or enterprise personnel can manually enter a patron ID number into a terminal 415 coupled to the system.

Depending on the services offered at a property 400, any combination of the following systems might be used to gather patron activity data: a Casino Management System (CMS) 440, a Lodging Management System (LMS) 450, an Event Management System (EMS) 460, a Point of Sale System (POS) 470, a Slot Monitoring System (SMS) 480, and a Pit Tracking System (PTS) 490.

The CMS 440 is responsible for overall management of the tracking of patron activity, and the determination of reward credits to be given to each patron based on such activity. The CMS 440 receives data describing a patron's activity from the various other systems, as further described below, makes the appropriate calculations for earned reward credits, and updates the patron's account in the PDB 422.

The SMS 180 comprises a computer system that monitors and tracks bets made by patrons at the various gaming machines 500 at the property 400. Gaming machines 500 may include a video poker machine or any other electronic gaming machine that is able to host the disclosed blackjack game. In a preferred embodiment, bet tracking is accomplished through a card reader associated with a gaming machine 500. A patron inserts his tracking card in the card reader to initiate bet tracking and removes it to terminate bet tracking. Preferably, a patron's betting activity at a gaming machine 500 is logged in real time in the SMS 480 so that the information is provided to the CMS 440 before the gaming session is terminated. Bet tracking data accumulated by the SMS 480 includes the identification of the games played, the amount of coin-in, the number of credits won, the number of credits played, the amount won or lost, and the time period that the patron played the game. U.S. Pat. No. 5,429,361, the contents of which are fully incorporated by reference herein, describes a system for tracking the betting activity of casino patrons at gaming machines. In one embodiment, the SMS 480 comprises the Slot Data System (SDS), a data collection system for slot accounting and patron tracking produced by Bally's Gaming and Systems.

In one embodiment, the CMS 440 includes or is coupled to a broadcasting system 445, such as an 802.11 transmitter, that enables a secure, wireless environment. In this way, offers can be delivered to patrons over a wireless LAN to properly equipped wireless devices held by the patrons, as described above.

The PTS 490 is used to track patron betting at gaming tables (e.g., a gaming table that accommodates the disclosed blackjack variant) 300 or gaming machines 500. The PTS 490 is supported on a computer system that transmits patron betting data to the CMS 140. In one embodiment, the PTS 490 uses card readers associated with patrons' positions at the gaming tables 300 to track their betting activity. Alternatively, an employee of the enterprise, such as a pit boss, manually enters a patron's gaming data into the PTS 490. In one embodiment, data regarding betting activity include a patron's time at a gaming table 300 and the table's minimum bet. U.S. Pat. No. 5,613,912, the contents of which are fully incorporated by reference herein, describes a system for automatically tracking the betting activity of casino patrons at gaming tables. Alternatively, tracking of patron betting at gaming tables is provided via a terminal 415 located in the pit near the tables. A patron provides her patron tracking card to a casino employee (e.g., a pit boss) who swipes the tracking card through a card reader at the terminal 415 to initiate the patron's session. The employee can then observe the patron's betting, and manually enter this information into the terminal 415, such as average amount bet, length of play, and so forth.

The LMS 450 comprises the software and hardware for managing hotel operations within the casino, including reservations, room service, and other activities associated with hotel operations. In a preferred embodiment, the LMS 450 communicates with the CMS 440 to search locally for selected customer information available on that system. However, LMS 450 may include its own local data store for patron data specific to the property 400. The LMS 450 transmits data regarding patrons' lodging activity to the PDB 420 when patrons check in and out of a hotel. In an embodiment, a patron's lodging data includes the dates that the patron stayed at a particular property and the type of rooms. This data may also be updated to a central PDB via an application server. In addition, the LMS 450 preferably transmits lodging data upon a request from the application server (via the local gateway server 410). The lodging data includes, for example, the dates that a patron stays at a hotel, room service activity, and billing information due to the patron's stay in the hotel.

The EMS 460 comprises software for handling ticketing information, reservations, and sales. The EMS 460 compiles patron activity data when patrons purchase tickets for an event (such as a show at the property), make reservations for an event, and attend the event. The EMS 460 transmits this data to the application server upon request (via the local gateway server 410).

The POS 470 comprises accounting software for operating restaurants and retail venues within the property as well as software for transmitting charge information to the other management systems. For example, data relating to meals charged to rooms are transmitted from the POS 470 to the LMS 450, and data relating to redeemed meal comps are transmitted from the POS 470 to the CMS 440. The gateway server 410 receives data relating to patron's purchases at a property from the POS 470 and transmits the data to the application server. This purchasing data includes, in an embodiment, the items or services purchased, the restaurant or retail venue where purchased, and the purchase amounts.

The property 400 preferably includes one or more customer service interfaces (CSI) 430. In one embodiment, a customer service interface 430 comprises a computer having an output display and a user input, such as a card reader and a touch screen. Patrons can access information for their account with a customer service interface 430, e.g., by swiping their cards through the card reader. The customer service interface 430 may be housed in a kiosk or other user accessible housing. In one embodiment, the CSI 430 receives patron data by way of their tracking cards swiped at customer service interfaces 430 located at various venues throughout the property 400. The CSI 430 transmits the received data to the PDB 420 to determine the identity of the patron and any required data in the patron's account (such as name, address, and any preferred customer status). In particular, the CSI 430 enables customers to view the reward credit balance, and to issue themselves redeemable "comp" tickets or cash voucher according to a provided menu of comps and their associated number of credits.

Data related to each patron's activity at a property 400, as collected by any of the management systems described herein, are communicated to the CMS 440, for analysis and determination of appropriate reward credits. The CMS 440 updates the PDB 422 with the results of such analyses, including updating a patron's account by incrementing (or decrementing) the patron's reward credit balance. Because each property 400 tracks patron betting activity, awards reward credits and/or other incentives based on such activity, and updates the PDB 422, the enterprise can reward patrons based on their overall betting (and other activity) at all of the casino properties. This cross-property nature of the system, in combination with the fixed and variable credit rate schedules, enables the enterprise to adjust the difficulty of a casino game based on their overall worth to the enterprise and/or from their overall betting activity, while also allowing individual properties 400 to reward the patron based on property-specific factors or rules. To maintain all account data up to date, the data processed by the local management systems are periodically updated to central PDB 422, e.g., in a batch process. In one embodiment, this update synchronizes data between multiple storage properties (i.e., PDB 422 and local stores associated with the CMS 440 at each property 400) to enable enterprise personnel at any property 400 to access the most recent and accurate data. When this configuration is employed with a WAN 450 having limited bandwidth, the data synchronization is preferably done when traffic on WAN 450 is low to minimize interference with other on-line data access transmissions.

The CMS 440 is responsible for receiving patron betting data from the SMS 480 and the PTS 490 and updating the PDB 422 with this information.

The foregoing is one example embodiment of a casino enterprise network, and it is noted that other implementations are entirely suitable for supporting an electronic gaming machine hosting a blackjack game as described herein.

Overview of an Electronic Gaming Machine

FIG. 5 illustrates a block diagram of an electronic gaming machine 500 configured to host a game of the disclosed blackjack variant, according to one example embodiment. One or more users may play the disclosed blackjack game on the electronic gaming machine 500, which accepts a primary and a secondary wager from the user, hosts a blackjack game on the machine 500 for the user, and dispenses a payout to the user based on the outcome of the game. The electronic gaming machine 500 may implemented as a standalone device or may be integrated into the system illustrated by FIG. 4. As described, the components of the electronic gaming machine 500 may be implemented as hardware components, software modules, or a combination of the two. Furthermore, the electronic gaming machine 500 may be embodied as a gaming terminal, a video game console, a personal computer (PC), or a software application.

The electronic gaming machine 500 includes a processor 510, a program memory 520, a wager mechanism 530, a user interface 540, a display 550, a payout mechanism 560, and a network interface 570. The processor 510, which may comprise one or more individual processors, receives and processes instructions for the blackjack game. Furthermore, the processor 510 outputs and receives signals to and from the wager mechanism 530, user interface 540, display 550, payout mechanism 560, and network interface 570. The processor 510 may be embodied as a microprocessor or an application-specific integrated circuit (ASIC).

The program memory 520 stores a set of instructions for hosting a round of the disclosed blackjack variant on the electronic gaming machine 500, using any of the embodiments previously described, including the various flowcharts indicating the overall program flow and operation of the primary and secondary wager, and modification process. Instructions from the program memory 520 are received and executed by the processor 510, operating in accordance with the methods disclosed in the flowcharts in FIGS. 2 and 3. Furthermore, the program memory 520 may store additional information, such as sets of instructions for hosting and/or playing other casino games or information on previous blackjack games played on the device. The program memory 520 may be a storage device including a combination of volatile memory (e.g., RAM) and non-volatile memory (e.g., a hard disk, flash memory, or removable storage medium).

While each electronic gaming machine 500 may include both an internal processor 510 and an internal program memory 520, the functions of the processor 510 or the program memory 520 may be executed external to the electronic gaming machine 500. For example, a server may perform the functions of the processor 510 and/or the program memory 520 and send the results to the electronic gaming machine 500 over a network.

The wager mechanism 530 receives a primary wager and a secondary wager from a user. The wager mechanism 530 detects when a primary wager and/or a secondary wager have been received from a user of the electronic gaming machine 500. Embodiments of the wager mechanism 530 may accept the primary and/or secondary wager in different forms. For example, a bill acceptor may accept the wagers in the form of tickets or bills, a coin acceptor may accept the wagers in the form of coins or casino tokens, or a digital interface may accept the wagers in the form of an electronic money transfer. The digital interface may be embodied as part of a software application that accepts virtual currencies from a user, such as credits used in a social network, social gaming system, or virtual world. In one case, the wager mechanism 530 is a card reader that accepts a stored-value card, a credit card, or a betting card. Alternatively, the wager mechanism 530 may be any combination of the aforementioned devices. When the primary and secondary wagers are received from the user, the wager mechanism 530 sends a signal to the processor 510 indicating that the wagers have been received and the amount of each wager. Furthermore, the wager mechanism 530 may store the wagers. For example, a wager mechanism that accepts hard currency may include a locked receptacle for bills or coins.

The user interface 540 allows the user to input commands to the electronic gaming machine 500. The user interface 540 may be one or more buttons, switches, levers, keyboards, joysticks, touchscreens, or any other apparent interface device. Furthermore, the user interface 540 may be a combination of the aforementioned interface devices. Each element of the user interface 540 may have a different function. In one example embodiment, an electronic gaming machine 500 has a button to start a round of blackjack, a button to increase and/or decrease wagers, a button to request more cards, and a series of buttons, each button corresponding to a specific card in the user's hand, to select a card to be used to modify the dealer's hand consistent with the embodiments described above. In another embodiment, all user interaction with the electronic gaming machine 500 is performed through a touchscreen. Based on user interaction with the user interface 540, the user interface 540 sends signals to the processor 510.

The display 550 outputs game information to the user. The display 550 receives signals from the processor 510 and displays information based on the received signals. The display 550 may convey to the user the user's blackjack hand, other players' blackjack hands, the dealer's hand, wager amounts, game outcomes, or any other relevant information. Furthermore, the display 550 may convey to the user information not directly related to the game, such as player profile information, customer service information, or other relevant information. The display 550 may be in the form of speakers, lights, screens, analog displays, or a combination of displays. Furthermore, some aspects of the display 550 may be combined with aspects of the user interface 540. In one example electronic gaming machine 500, the display 550 and user interface 540 are embodied as a single touchscreen.

The payment mechanism 560 dispenses a payout to the user based on the outcome of the blackjack game. The payment mechanism 560 receives a signal from the processor 510 to dispense a payout, determined by the processor 510, to the user. The payment mechanism 560 may dispense the payout as bills, casino tokens, coins, an electronic transfer, a stored-value card, or any other apparent form.

The network interface 570 connects the electronic gaming machine to external devices, such as those illustrated in FIG. 4. The network interface 570 may facilitate sending signals from the electronic gaming machine 500 to other devices, such as the slot monitoring system 480. Furthermore, the network interface 570 may facilitate the electronic gaming machine 500 with receiving signals. For example, the processor 510 may send information on the outcome of the blackjack game, information identifying the user, or any other relevant information to external servers through the network interface 570.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the named systems may be implemented via a combination of hardware and software, as described, or entirely in hardware elements. Third, the particular division of functionality between the various systems described herein is merely exemplary, and not mandatory; functions performed by one system may instead be performed by other systems, and functions performed in a single system may instead be performed by several different systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as systems, without loss of generality. The described operations and their associated systems may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The invention claimed is:

1. A gaming system comprising:

a processor;

a plurality of input devices including an item accepting device, a cashout element, and one or more wager receiving elements;

a display; and a program memory storing a pay table indicating a set of predetermined winning poker hands, each predetermined poker hand having a predetermined payout, and further storing program instructions corresponding to rules of blackjack, and further storing program instructions executable by the processor to cause the gaming system to:

display graphical representations of cards in a virtual card game;

establish a credit balance based, at least in part, on a monetary value associated with a physical item recognized by the item accepting device;

receive via use of the one or more wager receiving elements a primary wager from a player on an outcome of a virtual blackjack hand;

receive via use of the one or more wager receiving elements a secondary wager from the player, the secondary wager on whether a dealer's poker hand matches one of the predetermined winning poker hands;

present on the display a randomly selected virtual blackjack hand for the dealer and a randomly selected virtual blackjack hand for a player, wherein the dealer's blackjack hand and the player's blackjack hand are each represented by a plurality of virtual cards presented on the display, wherein the dealer's blackjack hand and the player's blackjack hand cannot share common cards from community cards;

determine whether the player wins or loses the primary wager based on the player's blackjack hand and the dealer's blackjack hand using the stored program rules of blackjack;

form a dealer's virtual poker hand by selecting the virtual cards of the dealer's virtual blackjack hand, and displaying the dealer's virtual poker hand on the display;

determine whether the player wins or loses the secondary wager based upon whether the dealer's virtual poker hand matches one of the predetermined set of winning poker hands indicated in the stored paytable;

responsive to the dealer's virtual poker hand matching one of the predetermined winning poker hands in the stored paytable, increase the credit balance with an amount based on the secondary wager and the payout of the matched predetermined poker hand in the stored pay table; and cause an initiation of any payout associated with the credit balance in response to a cashout input being received via use of the cashout element.

2. The gaming system of claim 1, wherein the program instructions executable by the processor to cause the gaming system to form a dealer's virtual poker hand by selecting the virtual cards of the dealer's virtual blackjack hand further cause the gaming system to:

modify the dealer's blackjack hand with one or more virtual cards from the player's blackjack hand to form the dealer's poker hand, the one or more virtual cards used to modify the dealer's poker hand selected from the player's hand, and display the modified dealer's blackjack hand on the display.

3. The gaming system of claim 2, wherein the program instructions executable by the processor to cause the gaming system to modify the dealer's blackjack hand with one or more virtual cards from the player's blackjack hand cause the gaming system to:

select one or more virtual cards of the dealer's blackjack hand;

select an equal number of virtual cards of the player's blackjack hand; and substitute the selected virtual cards of the dealer's blackjack hand with the selected virtual cards of the player's blackjack hand.

4. The gaming system of claim 2, wherein the program instructions executable by the processor to cause the gaming system to modify the dealer's blackjack hand with one or more virtual cards from the player's blackjack hand cause the gaming system to:

select one or more virtual cards from the player's blackjack hand; and add the selected virtual cards from the player's blackjack hand to the dealer's blackjack hand.

5. The gaming system of claim 2, wherein the program instructions executable by the processor to cause the gaming system to modify the dealer's blackjack hand with one or more virtual cards from the player's blackjack hand to form the dealer's poker hand cause the gaming system to modify the dealer's blackjack hand only to form a selected one of the predetermined winning hands.

6. The gaming system of claim 2, wherein the program instructions executable by the processor to cause the system to modify the dealer's blackjack hand with one or more virtual cards from the player's blackjack hand to form the dealer's poker hand cause the gaming system to modify the dealer's blackjack hand only to form only a six card straight flush.

7. The gaming system of claim 2, wherein the number of virtual cards from the player's blackjack hand that are used to modify the dealer's blackjack hand to form the dealer's poker hand is determined by the amount of the secondary wager.

8. The gaming system of claim 7, wherein the amount of the secondary wager includes a base amount, and zero or more increment amounts, wherein the player is allowed to modify the dealer's blackjack hand by one virtual card for each increment amount, up to a limited number of the increment amounts.

9. The gaming system of claim 8, wherein the limited number of increment amounts is two, whereby the player can select a maximum of three virtual cards from the player's blackjack hand to modify the dealer's poker hand.

10. The gaming system of claim 1, wherein the program instructions executable by the processor to cause the gaming system to form a dealer's poker hand from the virtual cards of the dealer's blackjack hand cause the gaming system to form the dealer's poker hand using all of the virtual cards in the dealer's blackjack hand.

11. The gaming system of claim 1, wherein the program instructions executable by the processor cause the gaming system to form a dealer's poker hand from the virtual cards of the dealer's blackjack hand cause the gaming system to form the dealer's poker hand using a subset of the virtual cards in the dealer's blackjack hand in combination with one or more virtual cards from the player's blackjack hand.

12. The gaming system of claim 1, wherein the predetermined winning poker hands includes a six-card straight flush.

13. The gaming system of claim 12, wherein the six card straight flush has a payout in the stored pay table of $1,000,000.

14. The gaming system of claim 1, wherein the predetermined winning poker hands consists of less than all ranked poker hands.

15. The gaming system of claim 1, wherein the predetermined winning poker hands consists of a six card straight flush, a full house, a three of a kind, and a pair.

16. The gaming system of claim 1, wherein one of the predetermined winning poker hands has a fixed payout of $1,000,000.

17. A gaming system comprising:

a processor;

a plurality of input devices including an item accepting device, a cash out element, and one or more wager receiving elements;

a display; and a program memory storing program instructions executable by the processor that, when executed, cause the gaming system to:

display graphical representations of cards in a virtual card game;

establish a credit balance based, at least in part, on a monetary value associated with a physical item recognized by the item accepting device;

display a pay table for a set of predetermined winning poker hands, each predetermined poker hand having a predetermined payout;

accept a primary wager from a player via use of the one or more wager receiving elements on an outcome of a blackjack hand;

accepting an secondary wager from the player via use of the one or more wager receiving elements, the secondary wager on whether a dealer's poker hand matches one of a predetermined set of winning poker hands;

deal on the display a blackjack hand to the dealer and a blackjack hand to the player, wherein the dealer's blackjack hand and the and player's blackjack hand each including a plurality of cards, wherein the dealer's blackjack hand and the player's blackjack hand cannot share common cards;

determine whether the player wins or loses the primary wager based on the player's blackjack hand and the dealer's blackjack hand using blackjack rules;

modify the dealer's blackjack hand with one or more cards selected from the player's blackjack hand to form the dealer's poker hand, and determine whether the dealer's poker hand, including the one or more modifying cards from the player's poker hand, matches one of the predetermined winning poker hands;

responsive to the dealer's poker hand not matching any of the predetermined winning poker hands, debit the credit balance with an amount based on the secondary wager from the player; and cause an initiation of any payout associated with the credit balance in response to a cashout input being received via use of the cashout element.

18. A gaming system of claim 17, wherein the cards substituted from the player's blackjack hand can be used to form only one of the predetermined set of winning poker hands.

19. A gaming system of claim 17, wherein the program instructions executable by the processor to cause the gaming system to modify cards from the player's blackjack hand cause the gaming system to modify the dealer's blackjack hand to form only a six card straight flush.

* * * * *